United States Patent [19]
Pretorius

[11] Patent Number: 5,513,784
[45] Date of Patent: May 7, 1996

[54] CARRIER DEVICE FOR CARRYING AND HOLDING APPLIANCES

[76] Inventor: Andries L. Pretorius, 4 Villa Sonica, Elm Street, Irene Park, Klerksdorp, Transvaal Province, South Africa

[21] Appl. No.: 272,150

[22] Filed: Jul. 8, 1994

[30] Foreign Application Priority Data

Jul. 12, 1993 [ZA] South Africa .................... 93/5014

[51] Int. Cl.$^6$ ................... A45F 4/00; A45F 3/14; F16M 11/38; F16M 11/14
[52] U.S. Cl. ................... 224/151; 224/258; 224/265; 224/908; 248/168; 248/181.1
[58] Field of Search ...................... 224/151, 257, 224/258, 201, 265, 908; 248/168, 181, 288.5; 294/139, 142; 354/82, 81, 293; 352/243

[56] References Cited

U.S. PATENT DOCUMENTS

| 3,211,405 | 10/1965 | Fey et al. | 248/181 |
|---|---|---|---|
| 3,767,095 | 10/1973 | Jones | 224/908 |
| 4,439,032 | 3/1984 | Congdon | 354/293 |
| 4,943,820 | 7/1990 | Larock | 224/265 |
| 5,397,041 | 3/1995 | Brusekar | 224/201 |

FOREIGN PATENT DOCUMENTS 2037001  7/1980  United Kingdom ............... 354/293

*Primary Examiner*—Linda J. Sholl
*Attorney, Agent, or Firm*—James Ray & Associates

[57] ABSTRACT

The invention relates to a carrier device for appliances such as video cameras, which device facilitates the stable support of a video camera, in use. The device includes two carrier members that are pivotally connected at one of their ends, whereas their opposite ends are connected by a flexible strap element whereby the carrier members can be held in an operative configuration in which an acute angle is defined between them. A mounting structure is located on one of the carrier members at its pivotally connected end, permitting a video camera to be mounted on the carrier device and use of the camera by holding the carrier device against the shoulder of a person with the strap element abutting the shoulder. In this configuration the video camera can be conveniently directed at a target, whereas a part of its mass is effectively carried by the person's shoulder.

11 Claims, 3 Drawing Sheets

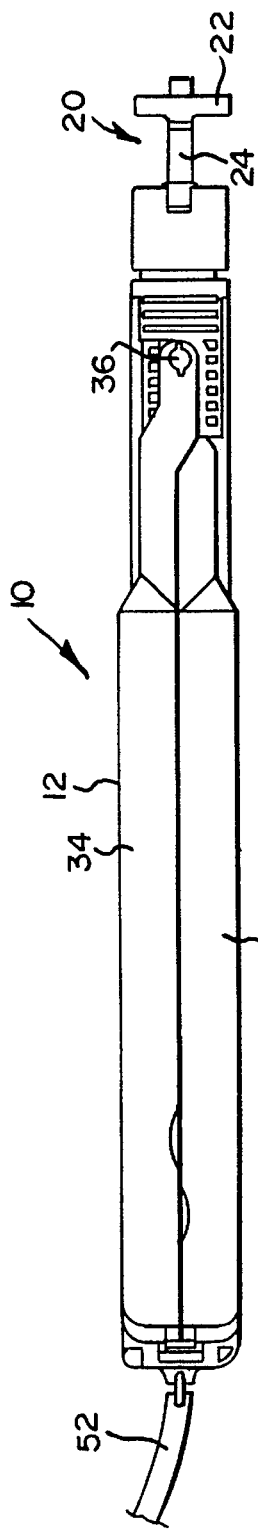
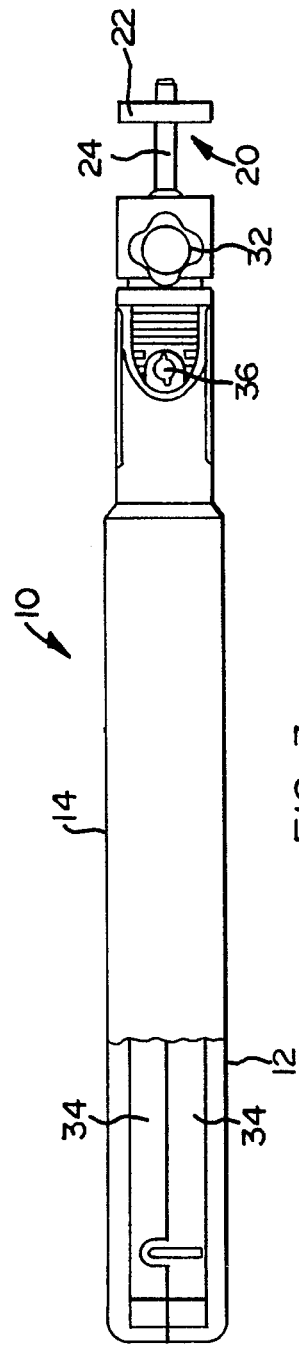
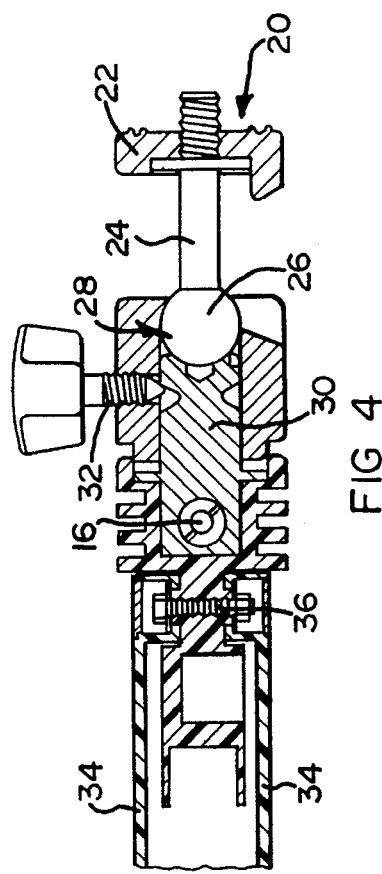

CARRIER DEVICE FOR CARRYING AND HOLDING APPLIANCES

This invention relates to a carrier device for carrying and holding appliances that require to be directed at targets or objects.

In order to effectively operate an appliance such as a camera, particularly a video camera, it is necessary to direct the appliance at a particular target or object and to stably hold it in position. Particularly in relation to a video camera, it is necessary to hold the camera above shoulder level in order to permit aiming of the camera via its viewfinder and when this is required over an extended period of time, holding of the camera in the required configuration becomes both tiring and inconvenient.

It is an object of this invention to ameliorate the above problem associated with the use of cameras. Although the carrier device of the invention is specifically suitable for use with cameras, it can also be used in conjunction with any other appliances that require to be held in a similar configuration to cameras for their effective operation and, as such, the carrier device of the invention is hereinafter merely referred to as a carrier device for an appliance.

According to the invention there is provided a carrier device for an appliance, which comprises two elongate carrier members that are connected at one of their ends and that define an acute angle between them in the operative configuration of the carrier device;

a strap element connected to the carrier members at their ends opposite to the connected ends thereof, the strap element determining the maximum angle between the carrier members in their operative configuration; and a mounting structure secured on one of the carrier members for mounting an appliance on the carrier device in a configuration in which, by holding the carrier device against the shoulder of a person with the strap element abutting the shoulder, the appliance can be directed in a required direction.

The two carrier members of the carrier device of the invention may be pivotally connected at one of their ends and, as such, may be pivotally displaceable between their operative configuration and an inoperative configuration in which they are folded onto one another. It is envisaged also that the carrier members may be length adjustable, each carrier member typically comprising two or more telescopically adjustable segments. This adjustment will permit the distance between an appliance mounted on the carrier device, when held in the configuration as above defined, and the eye of the person operating the appliance, to be adjusted, while together with the feature that permits the carrier members to fold onto one another, the carrier device is rendered collapsible into a very compact configuration in which it is easily portable.

Further according to the invention, one of the carrier members may be longitudinally divided into two segments, the two segments being pivotally connected for permitting displacement into a configuration in which an acute angle is defined between them and, with the two carrier members disposed in their operative configuration, a tripod-type structure is defined. As such, the carrier device of the invention can be used as a tripod in association with cameras and like appliances.

The mounting structure of the carrier device may be secured to its carrier member near its end that is connected to the other carrier member. Furthermore, the mounting structure may include a mounting formation formed to cooperate with a complementary mounting formation of an appliance for mounting the appliance on the carrier device. According to one particular embodiment of the invention, the mounting formation of the mounting structure may be formed to cooperate with the mounting formation that is conventionally provided on a video camera for mounting the camera on a tripod, therefore permitting the video camera to be mounted on the carrier device. The mounting structure also may be provided for a range of appliances to be mounted on the carrier device and it is envisaged also that the carrier device may include more than one mounting structure that can be selectively located on one of the carrier members for permitting a particular appliance, or a range of appliances, to be mounted on the carrier device.

Further according to the invention, the mounting structure may be adjustably secured to its carrier member, permitting adjustment of the angular position of the mounting structure with respect to the carrier member on which it is secured. According to one particular embodiment of the invention, the mounting structure and the carrier member on which it is secured define complementary ball and socket formations that are engaged with one another and whereby the mounting structure is adjustably secured to the carrier member. For this embodiment carrier device, locking means may be provided for releasably locking the position of the mounting structure with respect to the carrier member on which it is secured.

Still further according to the invention, the angular configuration of the carrier members in their operative configuration may be adjustable. Particularly, the strap element may be adjustably connected to at least one of the carrier members, the strap element permitting connection with the third carrier member at different locations along the length of the strap element for rendering the effective length of the strap element between the carrier members adjustable and thereby permitting adjustment of the angular configuration of the carrier members in their operative configuration. This adjustment also will permit the distance between an appliance mounted on the carrier device and the eye of the person operating the appliance to be adjusted.

The strap element preferably is of a flexible material, although the strap element may be in the form of a rigid fold-away strap element which still facilitates the collapse of the carrier device into a compact collapsed configuration.

Still further, the carrier device may include an elongate flexible carrier strap of which opposite ends have engagement formations for engagement with different locations on the carrier device and/or on an appliance mounted on the carrier device, permitting suspension of the carrier device with the appliance mounted thereon from the shoulder of a user.

Although it is generally anticipated that the carrier device will be provided as a separate device on which an appliance can be mounted, it is envisaged also that the device can form a part of an appliance, being permanently secured thereto via its mounting structure.

Further features of the invention, including the mode of use of the invention and the benefits of the invention, are described in more detail hereinafter with reference to an example of the invention, illustrated by way of the accompanying diagrammatic drawings. In the drawings:

FIG. 2 shows a top plan view of the carrier device of FIG. 1, in a collapsed inoperative configuration;

FIG. 3 shows a partially cut-away bottom plan view of the carrier device of FIG. 1, in its collapsed, inoperative configuration;

FIG. 4 shows a sectional side view of a portion of the carrier device of FIG. 1, in its collapsed, inoperative configuration;

Figure 1:
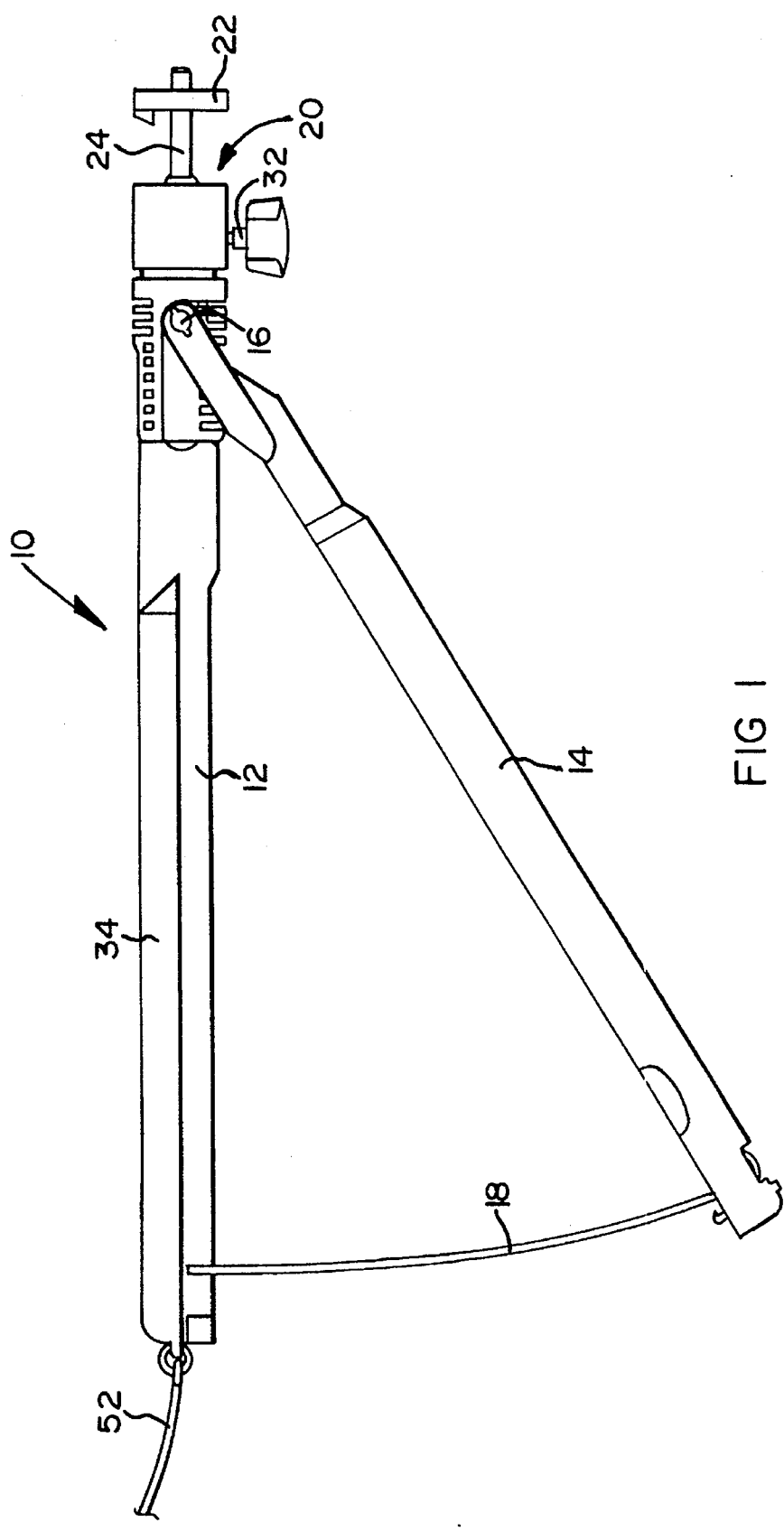
FIG. 1 shows a side view of a carrier device for an appliance, in accordance with the invention, in its operative configuration.

Referring to the drawings, a carrier device for an appliance, in accordance with the invention, is designated generally by the reference 10. The carrier device 10 includes two elongate carrier members, 12 and 14 respectively, that are pivotally connected to one another near one of their ends by a pivot pin 16. The opposite ends of the carrier members are connected by a flexible strap element 18. The mode of pivotal connection of the carrier members, 12 and 14, permit them to be effectively folded onto one another from the configuration as shown in FIG. 1 into the configuration as shown in FIGS. 2 and 3, which is a compact, collapsed configuration in which the device 10 can be easily stored away and transported.

The carrier device 10 includes further a mounting structure indicated generally by the reference 20, the mounting structure permitting an appliance and, particularly, a camera or video camera, to be mounted on the carrier device 10 in a configuration in which, by holding the carrier device against the shoulder of a person with the strap element 18 abutting against the shoulder, the appliance can be directed in a required direction, this mode of use of the carrier device 10 being described in more detail hereinafter.

The carrier device 10 as shown is particularly suitable for use in association with a video camera, and the like, and for this application the mounting structure 20 includes a mounting formation 22 that can cooperate with a complementary formation as is provided conventionally on a video camera for mounting the camera onto a tripod, for mounting the camera onto the carrier device. The mounting formation 22 is located at the end of a stem 24 which is connected to a ball formation 26, the ball formation 26 being located within a complementary socket formation 28 defined within the carrier member 12. The complementary ball and socket formations permit pivotal adjustment of the mounting formation 22 with respect to the carrier member 12 in order to facilitate the positional adjustment of a video camera, or the like, mounted on the device, in order to accommodate personal requirements of a user of the device, as is explained in more detail hereafter.

The socket formation 28 is partially defined by a sliding member 30 slidably located within the carrier member 12, being slidably displaceable by the end of a screw member 32 that can act on the sliding member for urging the sliding member against the ball formation 26 to thereby lock the position of the ball formation 26 within the socket formation 28. As such, the position of the mounting formation 22 with respect to the carrier device can be effectively locked. As is clear from FIG. 4 of the drawings, the stem 24 carrying the mounting formation 22 is displaceable between a position in which it is axially aligned with the carrier member 12 and a position in which it is substantially perpendicular to the carrier member.

It will be understood that the mounting structure and, particularly, the mounting formation, is particularly adapted for use with an appliance with which the carrier device is to be used and, as such, the exact configuration of the mounting structure and, particularly, the mounting formation, is greatly variable.

The carrier member 12 is longitudinally divided along the major portion of the length thereof into two segments 34, the two segments 34 being pivotally connected by a pivot pin 36 in order to permit angular displacement of the segments with respect to one another into a configuration in which an acute angle is defined between them. In this configuration and with the carrier members, 12 and 14, disposed in their operative configuration in which an acute angle also is defined between them, a tripod-type structure is provided, thus permitting use of the carrier device 10 as a tripod for a camera, or the like, as is described in more detail hereinafter.

In its fully collapsed configuration with the segments 34 of the carrier member 12 folded against one another and with the two carrier members, 12 and 14, folded together, the carrier device 10 defines a very compact configuration in which it can be easily transported. The design of the carrier device 10 and, particularly, of the two carrier members, 12 and 14, is such that they effectively fold into one another so that when folded together the two carrier members take on the configuration of a single elongate rod, or the like.

Figure 5:
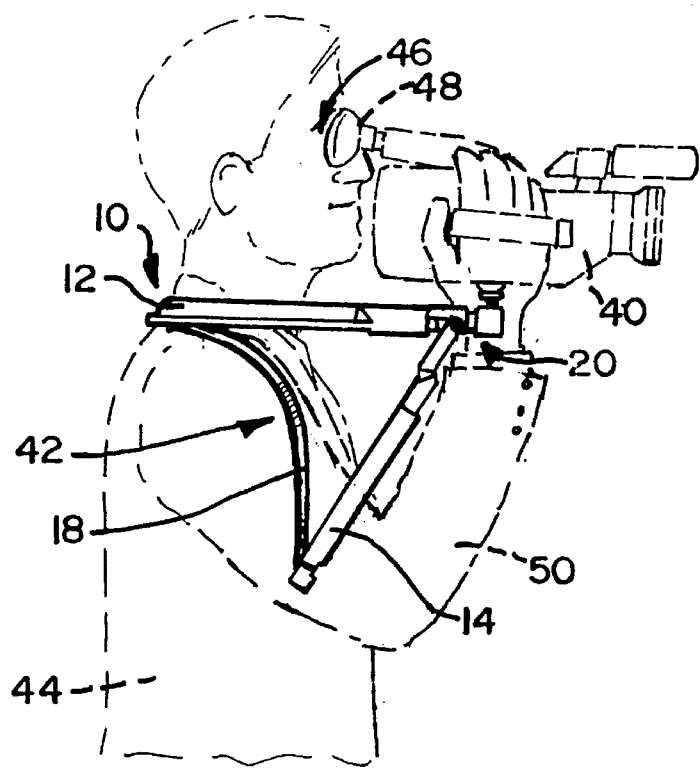
FIG. 5 illustrates schematically the mode of use of the carrier device of FIG. 1 in association with a video camera.

Referring particularly to FIG. 5 of the drawings, the carrier device 10 is shown with a video camera 40 mounted on the mounting structure 20 thereof.

For holding the camera 40 in a position with respect to the eye of a user, in order to facilitate directing of the camera at a required target or object, the strap element 18 is abutted against the shoulder 42 of the user 44. As the strap element is of a flexible material, the strap element 18 will conform to the shape of the shoulder 42 as is apparent from the drawing. When held in this particular configuration, the eye 46 of the user 44 can be effectively aligned with the viewfinder 48 of the camera 40, thus enabling the user to direct the camera at a required target or object. As is clear from the drawing, the combination of the carrier device 10 and video camera 40 is effectively held in position by the arm 50 of the user 44, the camera 40 being held in a conventional configuration by holding means provided for the purpose and being effectively pulled towards the shoulder of the user, which will enable the camera 40 to be stably held in position while the shoulder of the person will partially carry the load of the camera. By being so held, it is ensured that the camera can be stably held over an extended period of time without undue discomfort. It is anticipated that this mode of use of a video camera will greatly enhance the successful use thereof, insofar as the camera can thereby be stably held in position and the mass of the camera will at least be partially transferred to the shoulder of the carrier, which will also facilitate use of the camera.

In order to enhance still further the application of the carrier device 10, the effective length of the strap element 18 between the free ends of the carrier members, 12 and 14, may be rendered adjustable, thus permitting the angular configuration between the carrier members, 12 and 14, to be adjustable and, thereby, the distance between the eye of a user of an appliance mounted on the carrier device and the appliance as such. Clearly, this length adjustment of the strap element 18 can be effected in many different ways, it being envisaged that one end of the strap element 18 will be securable to its carrier member in different locations along the length thereof (not clearly shown).

It is also envisaged that the length of the carrier members, 12 and 14, may be adjustable and, for this purpose, it is envisaged that each carrier member, 12 and 14, may comprise two or more telescopically displaceable segments (not shown). Once again, this will accommodate the use of the carrier device in association with different appliances and will also facilitate various personal requirements. By rendering the carrier members, 12 and 14, length adjustable, the compactness of the device for storage purposes also is enhanced.

Still further according to the invention, the carrier device 10 includes an elongated strap 52 (only partially shown in FIGS. 1 and 2 of the drawings), one end of the strap being secured to the carrier member 12 of the carrier device 10 whereas the opposite end either can be connected at another location on the carrier device 10 or at a suitable location on an appliance mounted on the carrier device, thus enabling the device together with the appliance to be suspended, for example, from the shoulder of a user, in a position from which they can be easily and quickly displaced into their operative position as shown in FIG. 5 of the drawings.

Figure 6:
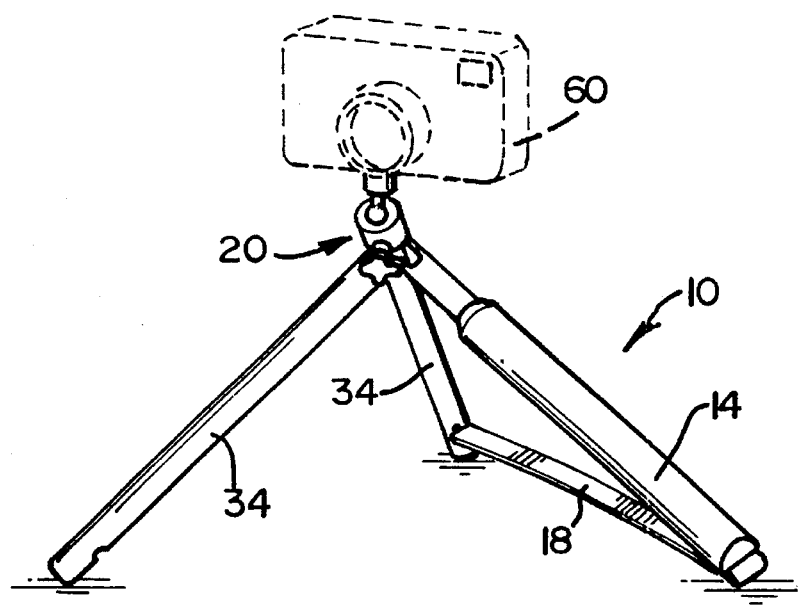
FIG. 6 illustrates schematically the mode of use of the carrier device of FIG. 1 as a tripod in association with a camera.

Referring now to FIG. 6 of the drawings, the carrier device 10 is illustrated in this figure, supported on a support surface, in a tripod-type configuration, the mounting structure 20 of the device 10 having a camera 60 mounted thereon. As is apparent from this drawing, the carrier device 10 can thus be used as a tripod for a camera. Similarly, a video camera can be mounted on the carrier device 10 while in its tripod configuration in order to enable absolute stable support.

It will be understood that the carrier device 10 can be used in conjunction with many different appliances which require stable holding to enable directing the appliances at specific targets or objects, specific features of the device being variable in order to accommodate the different appliances. It is also envisaged that a device as described can form a part of an appliance as such and the invention extends also to such an appliance which incorporates a carrier device, including the principles of the device 10 as described above, as part thereof.

The components and parts of the carrier device 10 can be of many different materials, it being envisaged that the carrier members, 12 and 14, will be of a suitable synthetic plastic material, as may be the mounting structure.

I claim:

1. A carrier device for an appliance, which comprises two elongate carrier members that are connected at one of their ends and that define an acute angle between them in an operative configuration of the carrier device, one of said carrier members being longitudinally divided into two segments with said two segments being pivotally connected for permitting displacement into a configuration in which an acute angle is defined between the segments and, with said two carrier members disposed in said operative configuration, a tripod structure is defined; a strap element connected to said carrier members at ends opposite to the connected ends thereof, said strap element determining a maximum angle between said carrier members in said operative configuration; and a mounting structure secured on one of said carrier members for mounting an appliance onto said carrier device in a configuration in which, by holding said carrier device against a shoulder of a person with said strap element abutting said shoulder, such appliance can be directed in a required direction.

2. A carrier device as claimed in claim 1, in which said two carrier members are pivotally connected at one of their ends and are pivotally displaceable between said operative configuration and an inoperative configuration in which they are folded onto one another.

3. A carrier device as claimed in claim 1, in which said mounting structure is secured to its carrier member near its ends that is connected to the other carrier member.

4. A carrier device as claimed in claim 1, in which said mounting structure includes a mounting formation formed to cooperate with a complementary mounting formation of an appliance for mounting such appliance onto said carrier device.

5. A carrier device as claimed in claim 4, in which said mounting formation of said mounting structure is formed to cooperate with such complementary mounting formation provided on a video camera for mounting such video camera on a tripod, thereby permitting such video camera to be mounted onto said carrier device.

6. A carrier device as claimed in claim 1, in which said mounting structure is adjustably secured to its carrier member, permitting adjustment of the angular position of said mounting structure with respect to said carrier member on which it is secured.

7. A carrier device as claimed in claim 6, in which said mounting structure and the carrier member on which it is secured define complementary ball and socket formations that are engaged with one another and whereby said mounting structure is adjustably secured to said carrier member.

8. A carrier device as claimed in claim 6, which includes locking means for releasably locking the position of said mounting structure with respect to the carrier member on which it is secured.

9. A carrier device as claimed in claim 1, in which an angular configuration of said carrier members in said operative configuration is adjustable.

10. A carrier device as claimed in claim 9, in which said strap element is adjustably connected to at least one of said carrier members, said strap element permitting connection with said carrier member at different locations along a length of said strap element for rendering an effective length of said strap element between the carrier members adjustable and thereby permitting adjustment of said angular configuration of said carrier members in said operative configuration.

11. A carrier device as claimed in claim 1, in which said strap element is of a flexible material.

* * * * *